Figure 1:
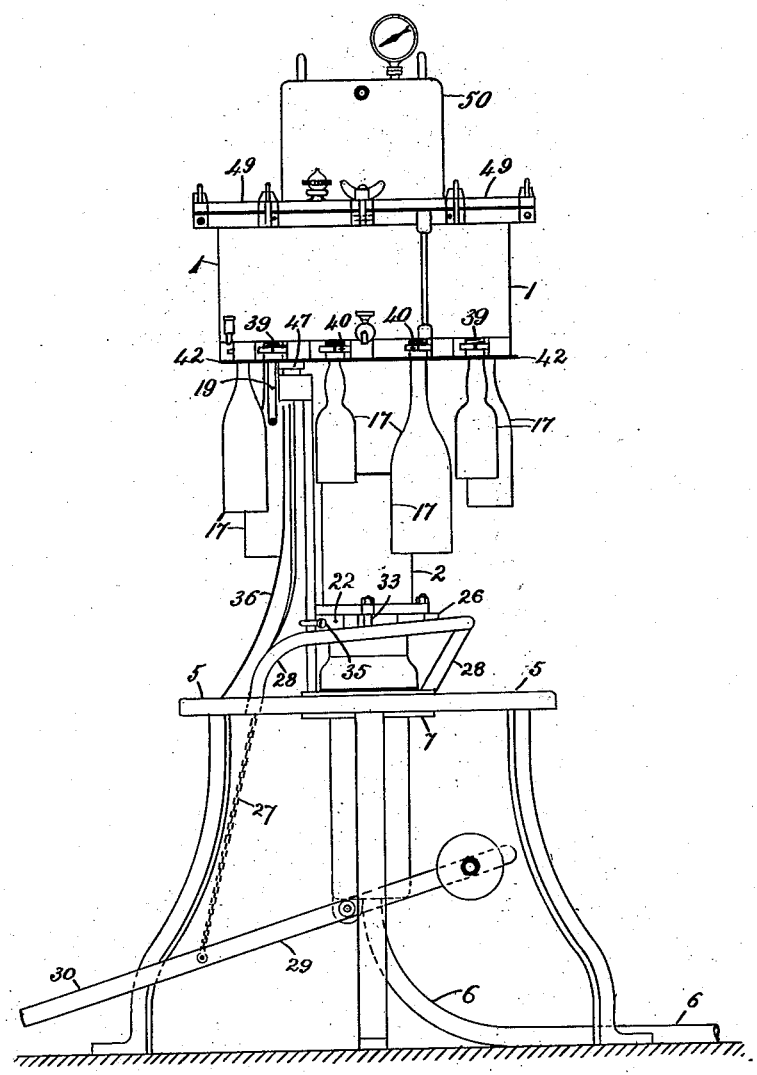

F. W. JACOB.
MACHINE FOR BOTTLING LIQUIDS.
APPLICATION FILED DEC. 30, 1907.

938,240.

Patented Oct. 26, 1909.
7 SHEETS—SHEET 3.

Witnesses.
W. MaD. Duvall.
F. R. Fitton

Inventor
F. W. Jacob
By Wilkinson, Fisher & Witherspoon
Attorneys

F. W. JACOB.
MACHINE FOR BOTTLING LIQUIDS.
APPLICATION FILED DEC. 30, 1907.

938,240.

Patented Oct. 26, 1909.
7 SHEETS—SHEET 4.

Witnesses.
A. Marl. Duvall.
F. R. Fitton

Inventor.
F. W. Jacob
By Wilkinson, Fisher & Witherspoon
Attorneys

F. W. JACOB.
MACHINE FOR BOTTLING LIQUIDS.
APPLICATION FILED DEC. 30, 1907.

938,240.

Patented Oct. 26, 1909.
7 SHEETS—SHEET 5.

Witnesses.
Mr. Max. Duvall
F. R. Fitton

Inventor.
F. W. Jacob
By Wilkinson, Fisher & Witherspoon
Attorneys.

F. W. JACOB.
MACHINE FOR BOTTLING LIQUIDS.
APPLICATION FILED DEC. 30, 1907.

938,240.

Patented Oct. 26, 1909.
7 SHEETS—SHEET 6.

Witnesses.
M. May Duvall.
F. R. Fitton

Inventor
F. W. Jacob
By Wilkinson, Fisher & Witherspoon
Attorneys.

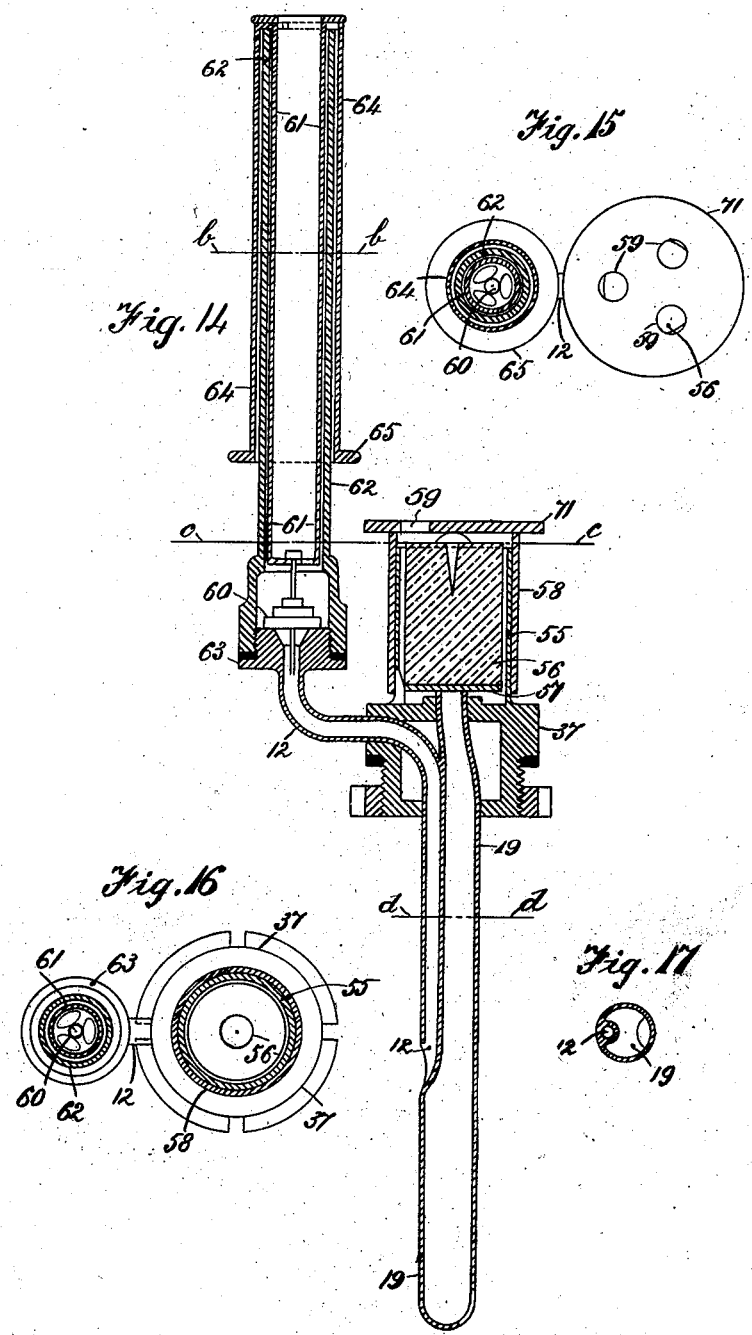

UNITED STATES PATENT OFFICE.

FREDERICK WILLIAM JACOB, OF LONDON, ENGLAND.

MACHINE FOR BOTTLING LIQUIDS.

938,240.  Specification of Letters Patent.  Patented Oct. 26, 1909.

Application filed December 30, 1907. Serial No. 408,624.

*To all whom it may concern:*

Be it known that I, FREDERICK WILLIAM JACOB, a subject of the King of Great Britain, of 77, 79, and 81 Theobald's road, London, in the county of Middlesex, England, merchant, have invented a new and useful Improvement in or Relating to Machines for Bottling Liquids, of which the following is a specification.

This invention relates to machines for bottling liquids under pressure, and it has more particular reference to that class known as revolving bottling machines such as are employed for beer, and the like. Such machines as above referred to have comprised a rotary tank or cistern adapted for connection to the cask of liquor and to a storage of gas or air under pressure, and have been fitted with a series of fillers provided with self-closing valves which opened when a bottle was placed thereunder. The means adopted for raising, holding in position, and transporting each bottle during the process of filling has necessitated a complicated series of levers and cams, while their detachment and removal have involved further mechanism. Numerous disadvantages have attended such constructions, for instance, the excessive weight of the moving part in consequence of the complicated mechanism, the liability of the parts to get out of order, the inaccessibility of the conduits for purposes of cleaning, the difficulty of employing bottles other than of a standard shape and size, while in the event of a bottle breaking a serious loss of liquor and gas or air resulted before the supply could be cut off due to the non-automatic action of the valves under all conditions of working.

The present invention has been devised with the object of overcoming all the foregoing disadvantages in a simple and effective manner, whereby the cost of such machines is greatly reduced, cleanliness is insured, wear and tear is reduced to a minimum, renewal of injured or worn parts is easy, and leakage is entirely obviated.

The invention consists essentially in providing a rotary bottling machine, manually operated step by step, in which the bottles are firmly held by their necks and automatically released when arriving at the point for removal, each filler of the machine being furnished with an automatic valve and an air duct normally closed by means of a flexible valve which is mechanically raised, after each bottle is locked in position for filling, whereby an inrush of gas under pressure takes place and when said pressure is equalized the self-acting valve on the filler automatically opens and filling commences.

A further improvement lies in dispensing with a separate series of levers, springs and the like, for operating the valves of each filler and actuating the entire number as each consecutively passes a fixed stop or trigger.

Figure 2:
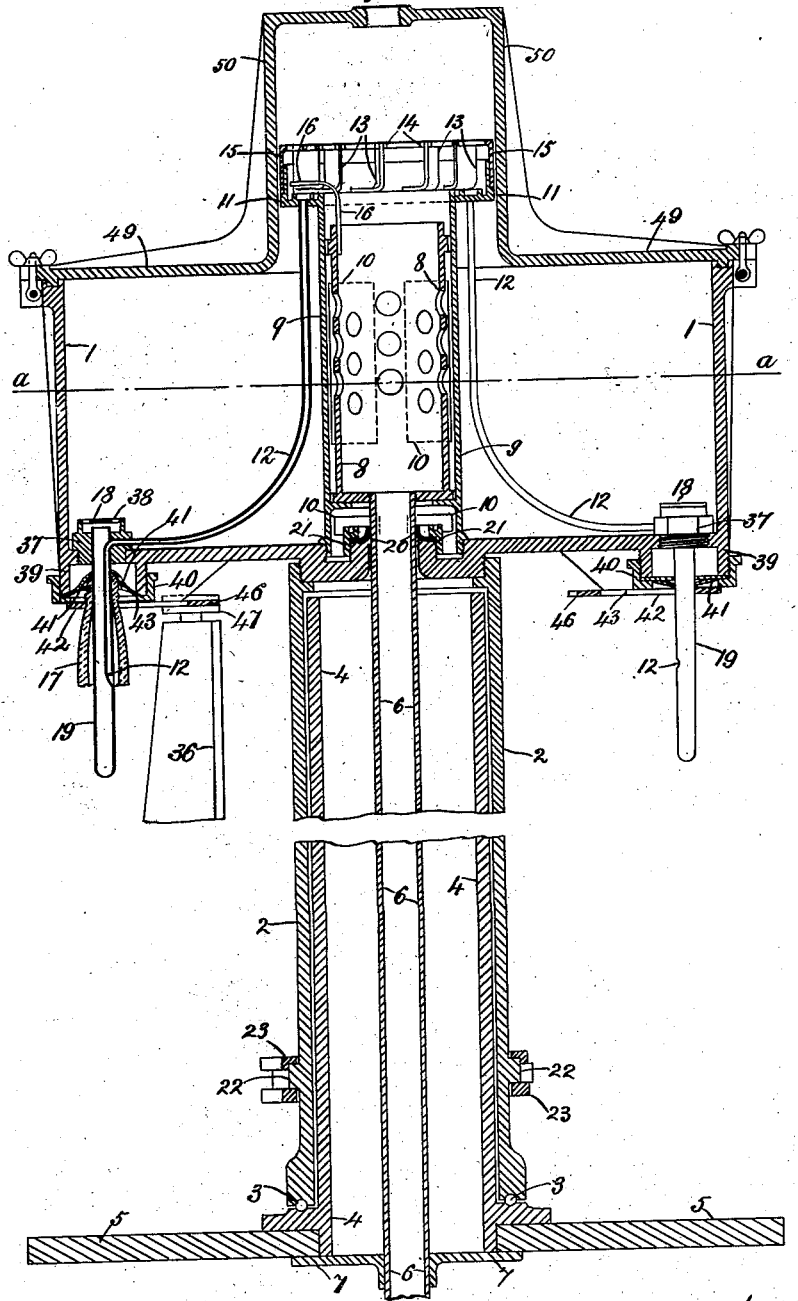
Figure 3:
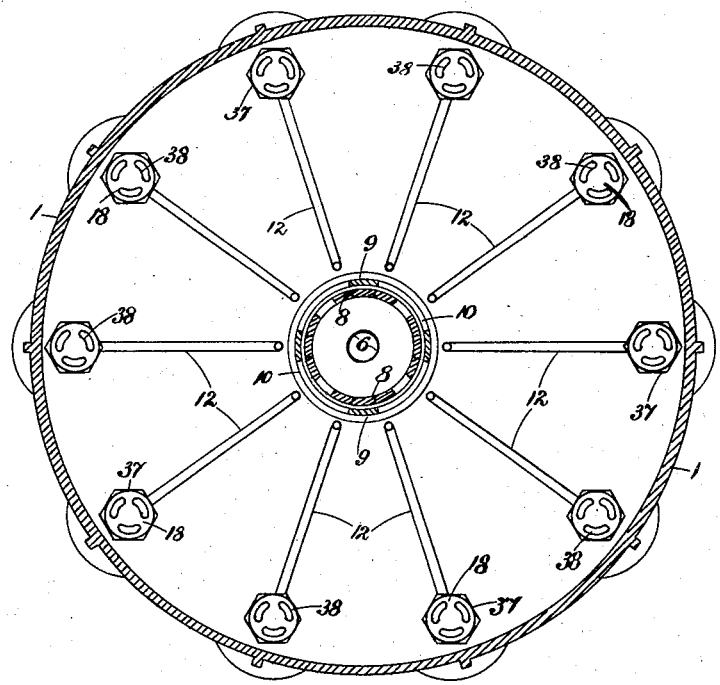
Figure 4:
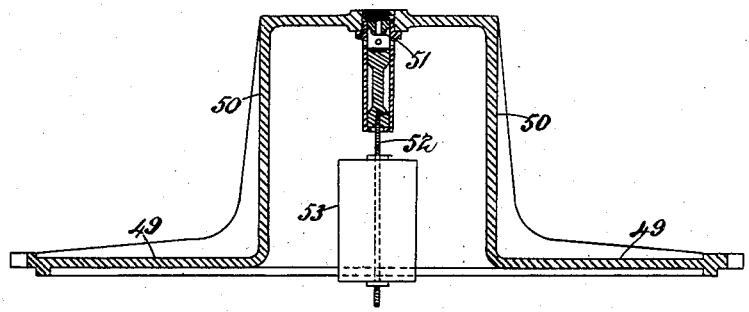
Figure 5:
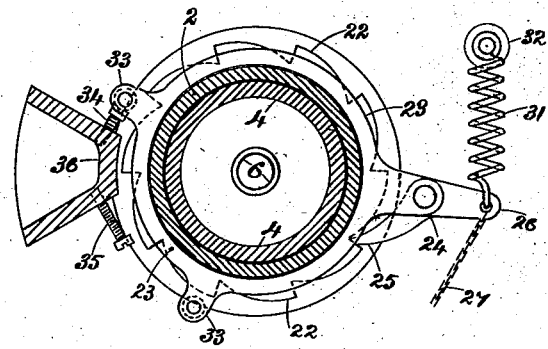
Figure 6:
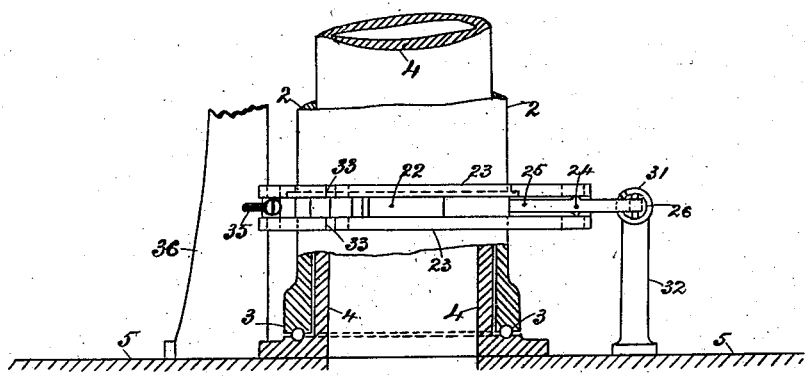
Figure 7:
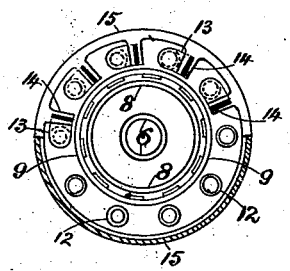
Figure 8:
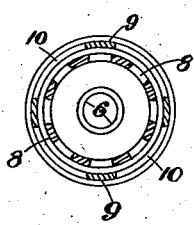
Figure 9:
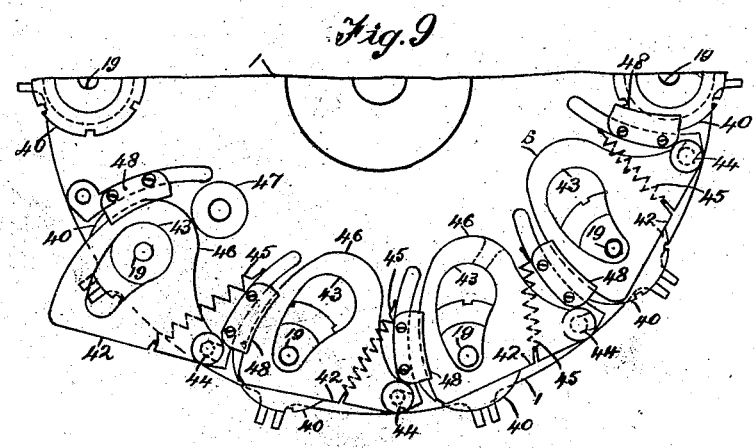
Figure 10:
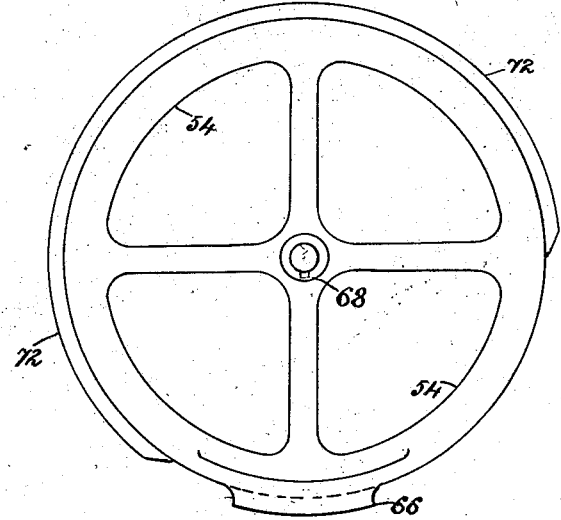
Figure 11:
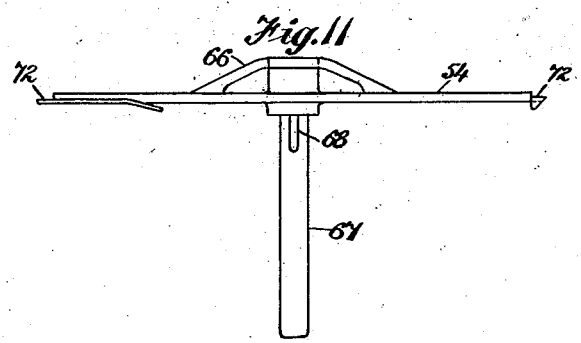
Figure 12:
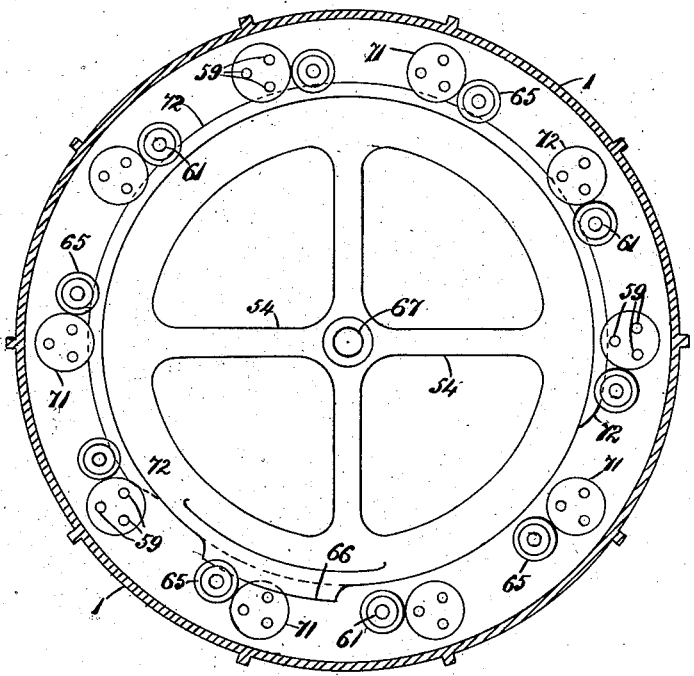
Figure 13:
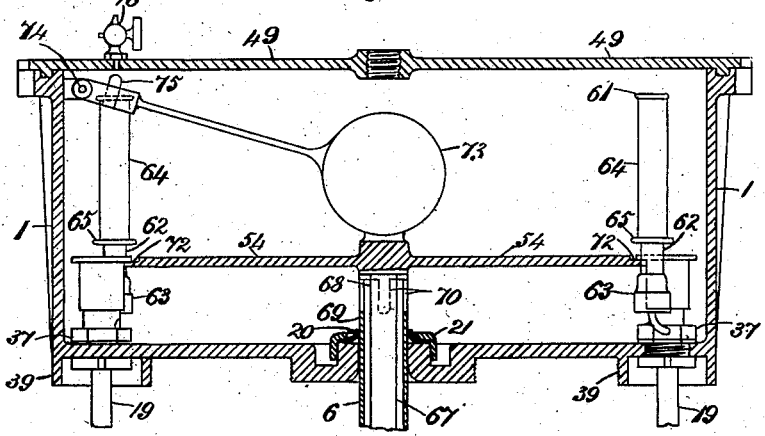

The accompanying drawings are in illustration of the present invention, Figure 1 being an elevation of a beer bottling machine constructed in accordance with the present improvements and adapted for operation by foot. Fig. 2 is a central vertical section of the revolving cistern and its supporting standard and showing also two of the fillers with their connections to the air valves. Fig. 3 is a sectional plan of the revolving cistern taken on the line *a—a* in the preceding figure. Fig. 4 is a detail sectional elevation of the cover for the revolving cistern and illustrating also a convenient form of valve for preventing air-locking of the apparatus. Fig. 5 is a part sectional plan showing a preferred form of mechanism for actuating the cistern step by step. Fig. 6 is a part sectional elevation of the preceding figure. Fig. 7 is a plan of the hollow cap supporting the flexible valves and the air passages hereinafter more fully described. Fig. 8 is a transverse section of the revolving and stationary feed pipe extensions within the cistern. Fig. 9 is a part underside plan view of the revolving cistern and showing the means adopted for locking the bottles in position, as well as for liberating them when filled ready for removal. Figs. 10 and 11 are respectively a plan and elevation of a cam device hereinafter explained and further illustrated in the next two succeeding figures. Fig. 12 is a sectional plan of a modified arrangement of the invention and showing combined air and liquor valves and fillers as well as the means for actuating same. Fig. 13 is a sectional elevation through the cistern shown in Fig. 12, only two of the combined valves being shown in position for the sake of clearness. Fig. 14 is a longitudinal section, to an enlarged scale, of the combined air and liquor valve shown in Figs. 12 and 13. Fig. 15 is a transverse section on the line *b—b* in the preceding illustration. Fig. 16 is a transverse section on the line $c$—$c$ in Fig. 14, and Fig. 17 is a similar section on the line $d$—$d$ in the same figure.

Like reference numerals designate the same or similar parts in the various illustrations.

According to one way of carrying my invention into effect, and as illustrated by Figs. 1 to 9 inclusive, I mount the liquor tank or cistern 1 upon a hollow standard 2 revolubly supported at its base upon a ball bearing 3, said standard 2 being arranged concentric with an inner hollow support 4 rigidly secured to the table 5 of the machine. The feed pipe 6 from the barrel or other source is rigidly held as by means of a flanged coupling 7 fixed to the table 5, so as to prevent its turning with the cistern 1, and it is conducted up through the inner support 4 and furnished with a perforated extension 8 within the cistern 1 concentric with a larger hollow cylinder 9, fixed to the bottom of the cistern—as shown—and perforated about its circumferential surface by elongated apertures 10, 10, for example. At the top of the larger hollow cylinder 9 which is carried to a suitable height within the cistern 1 above the level of the liquor I form an outwardly projecting gallery 11 around which are arranged and connected thereto a series of air ducts or gas conduits 12, 12, in number equal to that of the fillers; the bottling machine exemplified being fitted with 10 fillers. Each of the apertures around the gallery 11 connecting with these conduit pipes 12, 12, is closed by a flexible valve 13 of rubber or the like, which is made somewhat in the form of the letter L—as best shown in Fig. 2—the short arm of which is adapted to normally close the passage of air to the aforesaid conduits 12, 12, while the longer or perpendicular arm is fixed at its upper end to a radial arm 14, projecting inwardly from a hollow cap or cover 15 (Figs. 2 and 7) which rests upon and is fixed to the top of the projecting gallery 11 of the cylinder 9.

At a convenient point upon the upper end of the fixed perforated extension 8 I rigidly attach an outwardly and radially projecting stop or trigger 16 (Fig. 2), which is adapted as the cistern 1 is rotated to consecutively lift or move each flexible air or gas valve 13 to allow a supply of compressed carbonic acid gas or air to pass into each freshly attached bottle 17, and immediately the pressure on both sides of the self-acting valve 18 on the filler 19 is equalized it automatically lifts and filling commences.

To allow for the free rotation of the cistern 1 and to insure a perfectly liquid proof joint I provide at the bottom of said cistern and around the feed pipe 6 a strong flexible packing 20 of rubber or the like, coned upwardly toward its center which is always forced downward by the weight of liquor as well as the pressure of gas on top of same, and it is conveniently secured in position by a screwed flanged collar 21, clamping it to the bottom of the cistern 1; or, an ordinary cup-leather may be used.

At or near the base of the hollow standard 2 I form or fix thereto a ratchet wheel 22, the teeth of which are in number equal to that of the fillers carried by the liquor cistern, in the present case there being 10 teeth. Said ratchet wheel 22 is preferably actuated in the following manner, and as best shown by Figs. 1, 5 and 6:—Concentric with the standard 2 and near its base and preferably immediately above and below the ratchet wheel 22, I mount loose rings 23, 23, carrying between them a bell-crank 24, one arm 25 of which is adapted to act as a detent or pawl by engaging with the ratchet 22. To the other arm 26 of this bell-crank 24, I attach one end of a chain 27, conveniently carried through a bent pipe or guide 28 and fastened to a foot lever 29 pivoted beneath the machine. The treadle end 30 of this lever 29 is normally kept in the raised position by a strong spring 31 which may be attached to the loose rings 23, or as shown, one end thereof is connected to the arm 26 and the other end to a pillar 32 on the table 5, and so pulls the bell-crank 24 and pawl 25 backward ready for engaging the next tooth of the ratchet 22 and so keeps the treadle 30 raised. When the treadle 30 is depressed it operates the cistern 1 through the connections above described whereby a fresh filler 19 is brought into position to have a bottle 17 attached thereto after each movement of said treadle 30. Each depression of the foot lever 29 thus moves the cistern forward a distance corresponding proportionally to the movement forward of one tooth of the ratchet 22.

Two projections, conveniently lugs 33 between which are distance pieces for keeping the loose rings 23 parallel, are provided on said loose rings 23, 23, and are adapted to engage stops 34, 35—which may be made adjustable—upon the standard 36 fixed to the table 5, or upon the machine frame. One of these stops 34 prevents the detent 25 being drawn farther backward than is just sufficient for it to reëngage with the next tooth on the ratchet 22 after each operation of the foot lever 29, and the other 35 arrests the movement of the liquor tank 1 when it arrives at the position where a full bottle is detached and a fresh empty one applied.

Each filler 19 of the machine is carried by a nut or plug 37 screwed into the base of the cistern 1 near its circumferential edge, and over its upper and inner end but slightly away therefrom I arrange a flexible valve 18 of rubber or the like which is adapted to automatically close the upper end of the filler 19; or, as shown in Fig. 3 said valve 18 may be provided with a central solid portion and furnished with perforations 38 around same which assist the free passage of the liquid when said valve 18 is raised.

Below the cistern 1 and formed integrally therewith are depending flanges 39, concentric with each filler 19, each of said flanges 39 being screwed externally to receive a nut or cap 40 which retains a flexible diaphragm or washer 41 in position. This diaphragm or washer 41 is preferably made of rubber and furnished with a hole at its center somewhat smaller than the outside diameter of the neck of the bottle to be filled. When a bottle 17 is forced upwardly against the diaphragm or washer 41, it assumes a concave form as shown at the left hand side of Fig. 2, and thereby makes a perfect joint around the neck of the bottle.

Below each diaphragm 41 I pivotally mount a flat plate 42, (Figs. 2 and 9) provided with an elongated aperture 43 somewhat curved circumferentially and larger at one end than at the other so that when a bottle neck 17 is passed therethrough from the larger end, and the plate is moved about its pivot 44, the narrower part of the aperture 43 will be forced under and against the lower edge of the flange on the neck and lock it firmly to the machine. This plate 42 is normally forced in one direction, that tending to hold the bottles 17 in position, by means of a strong spring 45 attached at one end thereto and at the other to the base of the cistern 1, and is operated in the reverse direction by a curved edge 46 thereof engaging with and being passed over a roller 47 revolubly mounted on the upper end of the aforesaid standard or bracket 36, or, it may be fixed to a convenient part of the framework of the machine, said roller 47 thereby acting as a cam-path for the moving plate 42. A supporting ledge or guide 48 is provided remote from the pivot 44 so that the plate 42 is always retained perfectly horizontal and jamming prevented.

The air ducts 12, 12, from the gallery 11 are carried down through the filler tubes 19 to the desired point to stop the filling at the required level.

The cistern 1 is provided with an easily detachable cover 49 and is fitted also with a float adapted to operate an air-valve so that air-locking of the apparatus is prevented; or, as shown, I may furnish the cover 49, with a centrally arranged cylindrical portion 50 in the crown of which the air valve 51 is situated, the spindle 52 of said valve being somewhat elongated and connected at its lower end to a cylindrical float 53 conveniently adapted to move within the perforated extension 8 aforesaid.

According to another form of my invention and as illustrated by Figs. 10 to 17 inclusive I dispense with the perforated extensions 8 and 9 in addition to the long air ducts 12 aforesaid and in their place employ a combined air and liquor valve and filler 19 which is actuated by a fixed disk cam 54 arranged within the cistern 1 at a little distance from its bottom. In this case, and as best shown by Figs. 14 to 17, each filler 19 is carried by a screwed nut or plug 37 as aforesaid and is furnished at its upper part with a perforated cylindrical extension 55 in which is situated a cork float 56, preferably faced at its lower part with a thin layer of rubber 57 which is adapted to close the upper end of the filler 19 somewhat similarly to the flexible valve 18 hereinbefore described. Over the cylindrical extension 55 is fitted a freely slidable metal cup or cover 58 preferably perforated in its crown by holes 59 to prevent a vacuum being created therein. This cup or cover 58 in use is adapted by its own weight to keep the float 56 normally seated upon the upper end of the filler 19. Connecting with each filler tube 19 is an air or gas duct or connection 12 which is normally closed by a flexible valve 60 carried at the lower end of a vertically disposed tube 61 concentrically arranged within a second tube or column 62 conveniently fixed to a flanged extension 63 of the air duct 12, and these tubes are of such a height as to reach above the normal liquor level within the cistern 1. Concentric with the tube 61 and carried thereby is an outer tube 64 furnished at its upper end with an internal flange or projections which normally rest upon the top of the column 62, and at its lower end with an outwardly projecting flange 65 for engaging with an upstanding projection or path 66 upon the disk cam 54 aforesaid. The disk cam 54 is preferably formed, as shown, circular in plan and it is fixed in position by means of a spindle 67 taking into bearings—not shown—formed in the upper end of the feed pipe 6; and it is prevented from rotating by a key 68 engaging with a keyway 69, Fig. 13. Perforations 70 are made for the passage of the liquor from the pipe 6 into the cistern 1. 71 is a flange formed on the slidable cap or cover 58 which is adapted to co-act with a projecting rim 72 furnished around the greater part of the circumferential edge of the disk 54. 73 is a float hinged at 74 to the cistern 1 and carrying a rubber nipple 75 which when raised closes the air vent or cock 76. It will be seen that by this arrangement of parts greater compactness is insured while the cylindrical portion 50 of the cover 49 and the float 53 are dispensed with.

The operation of my improved bottling machine is briefly as follows:—The cistern 1 is first charged with carbonic acid gas from a convenient supply to say a pressure of 20 lbs. when the connection from the supply is cut off. A similar or equal pressure is put upon—and maintained on—the liquor to be racked off and bottled. The supply of liquor to the machine is then turned on and a bottle 17 pushed up against the diaphragm 41 as above described, the foot lever 29 is then depressed when the bottle 17 is automatically locked in position by the locking plate 42 and a fresh filler 19 brought into the same position to receive a further bottle, while at the same time the flexible valve 13 or 60 controlling the air duct 12 to the filler 19, now moved forward one tooth of the ratchet 22, is raised and a supply of gas or air introduced into the bottle. In the one case this is effected by the action of the trigger 16 and in the other by the projecting rim 72 co-acting with the flange 65 at the lower end of the tube 64. As the pressure of the gas in each bottle 17 balances with that in the cistern 1, the self-acting valve 18 lifts, or, in the modified form of the invention the float 56, as the cap 58 is raised by the projection 66 on the disk 54 the cork float 56 rises and filling commences. The supply of gas or air is then forced back into the cistern 1 through the flexible air valves aforesaid by the liquor running into and filling the bottle 17 which operation continues until the level reaches that of the lower extremity of the air duct 12, the liquor then rises up said air duct until it reaches the level of the liquor in the cistern. The full bottle then travels around with the machine until it reaches the operator who removes it, and so on. Should a bottle burst it will be seen that the supply of liquor and gas or air is automatically, and instantly, cut off and undue loss prevented, while the small amount of liquor left in the tubes when a bottle is removed is held therein suspended by the vacuum created above it.

The details of construction may be varied more or less without departing from the nature of my invention: for example, I may arrange the air ducts and flexible valves immediately above the fillers and make the trigger radially long enough to operate them, and by this means dispensing with the hollow cylinder hereinbefore described. Furthermore I may dispense with the foot lever 29 and operate the machine by moving the cistern around by hand.

By my improvements I provide an extremely simple and effective machine for the purpose specified, and it will be readily understood that by the present invention reliability in action is insured, the machine is simple to construct, easily manipulated, accessible in all parts for cleaning, readily adjusted and not likely to get out of order, while it may be placed adjacent a corking machine and the dual operations of filling and corking continuously carried on, thus effecting a great saving in time and labor.

I claim:

1. In a machine for bottling liquids, the combination of a suitable support, means for operating said support step by step, means carried by said support for holding the bottles by their necks, means for automatically releasing said holding means at the proper point, and fillers for the machine, including means for supplying the liquid to the bottles, an automatic valve between the liquid-containing means and the bottles, an air duct leading to each of the bottle holding means, a flexible valve normally closing said air duct, and means for mechanically raising each of said air valves in turn over each of the bottles after it is locked in position for filling, substantially as described.

2. In a machine for bottling liquids, the combination of a hollow standard, a revoluble support for said standard, a cistern or tank mounted upon said standard, a feed pipe passing through said support and into said cistern and provided at its upper end within said cistern with a perforated extension, a perforated cylinder located in said tank and surrounding said extension, a gallery carried on the top of said cylinder, a series of air ducts leading from said gallery, a series of bottle supports carried at the bottom of said tank through each of which an air duct passes, a flexible valve for each of said air ducts, a radial trigger fixedly mounted on the extension of the feed pipe, a series of fillers, one for each flexible duct, and means for rotating said cistern, substantially as described.

3. In a machine for bottling liquids, the combination of a feed pipe provided with a perforated extension at its upper end, a cistern or tank through the bottom of which said feed pipe projects, a circumferentially perforated cylinder in said tank surrounding said extension, a gallery mounted on the upper part of said cylinder, a series of air ducts carried by said gallery and radially secured to said gallery, a flexible valve for closing each of said air ducts, a radial trigger carried by said feed pipe extension, and means for rotating said cistern, substantially as described.

4. In a machine for bottling liquids, the combination of a rotatable cistern, feeding means for said cistern, means for rotating said cistern, a series of bottle filling means carried by said cistern, an air duct for each of said bottle filling means, an L-shaped flexible valve for closing the end of each of said air ducts, and a fixed device adapted to engage each of said valves in succession as the cistern is rotated, substantially as described.

5. In a machine for bottling liquids, the combination of a rotatable tank, a gallery therein, a series of bottle fillers, an air duct leading from said gallery to each of said fillers, L-shaped radial arms mounted on said gallery, a flexible valve carried by each of said arms and adapted to close the upper end of each of said air ducts, and means for opening said valves in succession, as the cistern is revolved, substantially as described.

6. In a machine for bottling liquids, the combination of a rotatable cistern, a series of fillers carried thereby, a bottle support arranged in proximity to each of said fillers, and a perforated flexible diaphragm adapted to engage each bottle as it is inserted in one of said fillers, substantially as described.

7. In a machine for bottling liquids, the combination of a rotatable cistern, a series of bottle supports carried by said cistern, and means for locking said supports around the necks of the bottles, said means consisting of flat plates, each provided with an elongated aperture larger at one end than at the other, a support on which said plates are pivotally mounted, springs for normally drawing said plates in one direction, and a roller carried by said last mentioned supports for forcing said plates in the other direction at the proper time, thus permitting the removal or insertion of a bottle, substantially as described.

8. In a machine for bottling liquids, the combination of a rotatable tank, a hollow column supporting said tank, a series of bottle holding means and fillers carried thereby, and means located on the outside of said column for rotating said tank, consisting of a ratchet wheel, loose rings surrounding said ratchet wheel, a bell crank lever, one arm of which acts as a detent or pawl pivotally carried by said rings, a spring normally pulling said lever in one direction, a chain attached to said lever, and a foot lever connected to said chain, substantially as described.

In witness whereof I have hereunto set my hand in the presence of two witnesses.

FREDERICK WILLIAM JACOB.

Witnesses:
ALFRED T. BRATTON,
DOROTHY K. BOYLE.